(12) United States Patent
Wild et al.

(10) Patent No.: US 6,603,134 B1
(45) Date of Patent: Aug. 5, 2003

(54) OPTICAL DETECTION SYSTEM

(75) Inventors: Norman R. Wild, Nashua, NH (US); Paul M. Leavy, Jr., Lynnfield, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 04/623,186

(22) Filed: Mar. 10, 1967

(51) Int. Cl.$^7$ ............... B64D 1/04; G01B 11/26; G01J 5/02
(52) U.S. Cl. ............ 250/526; 89/1.11; 250/342; 356/138.1
(58) Field of Search ............... 343/18 E; 331/94.5; 250/83.31 R, 526, 342; 88/1 M, 1 U; 356/209, 138.1; 89/1.11

(56) References Cited

U.S. PATENT DOCUMENTS

| | | | | |
|---|---|---|---|---|
| 2,970,310 A | * | 1/1961 | Bruce | 343/13 X |
| 3,020,792 A | * | 2/1962 | Kingsbury | 88/1 UX |
| 3,098,932 A | * | 7/1963 | Laudon | 250/83.3 |
| 3,215,842 A | * | 11/1965 | Thomas | 343/18 X |
| 4,112,300 A | * | 9/1978 | Hall et al. | |

OTHER PUBLICATIONS

Electronics, Nov. 10, 1961, pp. 81–85.*

* cited by examiner

*Primary Examiner*—Stephen C. Buczinski
(74) *Attorney, Agent, or Firm*—Daniel J. Long (57) ABSTRACT

The present invention pertains to radiant energy systems and more particularly to systems exhibiting the retroreflection principle wherein the system comprises a focusing means and a surface exhibiting some degree of reflectivity positioned near the focal plane of the device, and wherein incident radiation falling within the field-of-view of said system is reflected back in a direction which is parallel to the incident radiation. The present invention has great applicability in military optical system applications for detecting the presence of an enemy employing surveillance equipment and for neutralizing this surveillance capability.

47 Claims, 3 Drawing Sheets

OPTICAL DETECTION SYSTEM

Applicants herein have made the discovery that any type of focusing device in combination with a surface, exhibiting any degree of reflectivity and positioned near the focal plane of the device, acts as a retro-reflector. A retroreflector is defined as a reflector wherein incident rays or radiant energy and reflected rays are parallel for any angle of incidence within the field-of-view. A characteristic of a retroreflector is that the energy impinging thereon is reflected in a very narrow beam, herein referred to as the retroreflected beam. This phenomenon is termed retroreflection.

It is herein to be noted that the term radiant energy includes light energy, radio frequency, microwave energy, acoustical energy, X-ray energy, heat energy and any other types of energy which are part of the energy spectrum and which are capable of being retroreflected by the device, instrument or system sought to be detected.

One type of optical device which exhibits this phenomenon, and thus is a particular type of retroreflector, is a corner reflector consisting of three mutually perpendicular reflecting planes, However, this type of retroreflector is both difficult and expensive to fabricate.

Due to the applicants discovery, it has now become possible to accomplish a great many feats heretofore considered impossible, as will become more apparent from the discussion to follow hereinafter. In this context it should be noted that the eyes of human beings, as well as those of animals, operate as retroreflectors. Also, any optical instrument which includes a focusing lens and a surface having some degree of reflectivity, no matter how small, positioned near the focal point of the lens, act as a retroreflector, whereby any radiant energy from a radiant energy source directed at these instruments is reflected back towards the source in a substantially collimated narrow beam.

It is therefore the primary object of the present invention to provide a method and apparatus for detecting objects exhibiting retroreflection characteristics.

It is another object of the present invention to provide a method and apparatus to detect objects having retroreflection characteristics by illuminating the same with a radiant energy source.

It is a more particular object of the present invention to provide a method and apparatus for scanning an area to detect the presence of optical instruments such as binoculars, telescopes, periscopes, range finders, cameras, and the like.

It is a further object of the present invention to provide means and apparatus for determining the characteristics of a device exhibiting retroreflection characteristics from a remote location.

It is a further object of the present invention to provide a method and apparatus for detecting optical instruments for rendering the instruments ineffective and for neutralizing humans utilizing said instruments by employing lasers or similar high energy sources.

It is yet another object of the present invention to provide a method and apparatus for transmitting and receiving radiant energy utilizing concentric optics.

These and other objects, features and advantages of the present invention will become more apparent from the following detailed discussion considered in conjunction with the accompanying drawings, wherein:

In accordance with the general principles of the present invention an optical system consisting of a focusing lens and a reflective surface positioned near the focal plane of said lens has radiant energy rays supplied thereto by a radiant energy transmitter. The radiant energy rays reflected by the optical system due to its retroreflection characteristics are recovered by a radiant energy receiver to thereby detect the presence and relative position of said optical system. The output of the radiant energy receiver may be applied to a utilization means for determining the characteristics of the retroreflector or for directing a weapon means.

Figures 1, 2, 3, 4, 6:
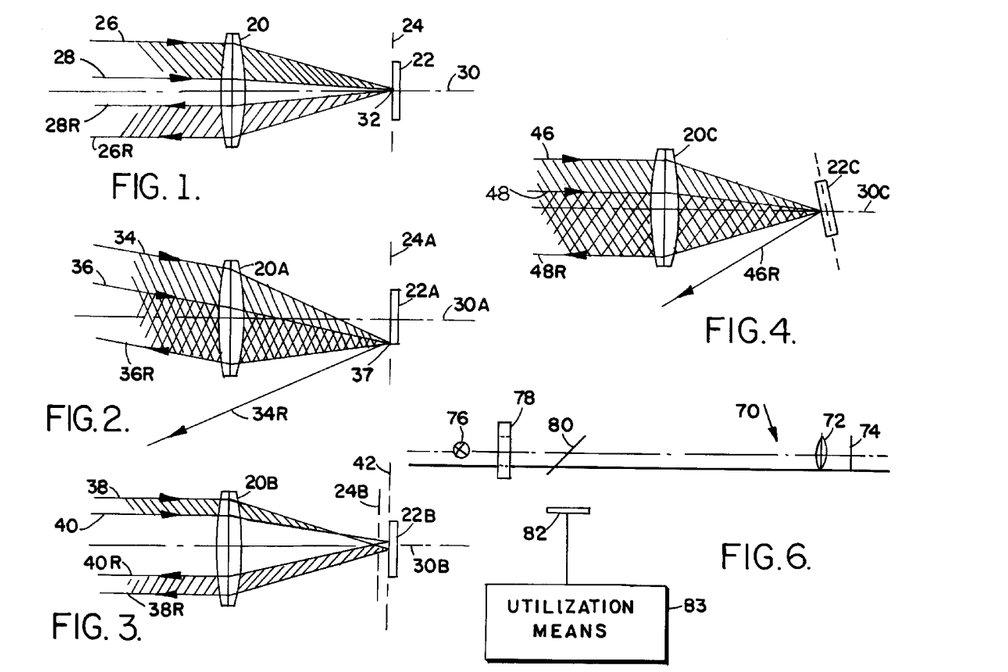
FIG. 1 is a diagram showing a retroreflection system consisting of a lens and a reflector wherein the source radiation is parallel to the optical axis of the lens.
FIG. 2 is a diagram of a retroreflection system similar to that of FIG. 1, wherein the source radiation is not parallel to the optical axis of the lens.
FIG. 3 is a diagram of a retroreflection system similar to FIG. 1 wherein the lens is imperfect so as to form an image rather than focusing at a single point.
FIG. 4 is a diagram of a retroreflection system wherein the reflector is obliquely positioned with respect to the optical axis of the lens.
FIG. 6 is a schematic representation depicting a beam splitting optical system for transmitting and receiving radiant energy.

Referring now to the drawings and more particularly to FIG. 1 thereof, there is shown an optical system consisting of a lens 20 and a reflective surface 22, which herein is a mirror, positioned in the focal plane 24 of the lens 20. Rays of radiation 26 and 28, respectively, are directed towards the system, and more particularly towards the lens 20, from a radiation source (not shown); the incident rays in the present illustration being parallel to the optical axis 30 of the lens. It is herein to be noted that for the purpose of clarity the incident rays are herein shown as being confined to the top half of the lens 20. The incident rays 26 and 28 are refracted by the lens 20 and focused at the focal point 32 of the lens, which focal point lies on the mirror 22. The rays are then reflected by the mirror so that the angle of reflection equals the angle of incidence, and are returned to the lower half of the lens where they are again refracted and emerge therefrom as retroreflected rays 26R and 28R. The rays 26R and 28R are returned to the radiation source parallel to the incident rays 26 and 28 thereof. However, as shown in the drawing, the relative positions of the rays 26 and 28 are inverted so that the image returned to the radiation source is also inverted.

In the optical system depicted in FIG. 2, similar parts are de-noted by similar reference numerals. In this system the rays 34 and 36 are not parallel to the optical axis 30A of both the lens 20A and the mirror 22A, the mirror 22A being positioned in the focal plane 24A of the lens. The rays 34 and 36 are refracted by the lens 20A and focused at a point 37 removed from the optical axis but still on the focal plane. The rays 34 and 36 are reflected by the mirror. Both of the rays 34 and 36 would normally emerge from the lens as retroreflected rays 34R and 36R, after refraction by the lens, and would be returned to the source of the rays 34 and 36 in a direction parallel thereto. However, since the lens 20A is of finite size, the reflected ray 34R will miss the lens and will not be retroreflected. The loss of reflected rays in this manner is called "vignetting".

In the system depicted in FIG. 3 wherein similar parts are de-noted by similar reference numerals, the lens 20B is assumed to be imperfect; i.e., it has aberrations. In this case the rays 38 and 40 are parallel to the optical axis 30B but are not focused at a single point on the focal plane 24B, and instead form an image on the mirror 22B, which image is referred to as the circle of confusion. In most practical optical systems there are circles of confusion and the mirror is normally positioned at the plane of least circle of confusion, herein depicted by the reference numeral 42. Thus, the image formed on the mirror by means of the rays 38 and 40 can be considered to be a radiant source, and the retroreflected rays 38R and 40R exit from the lens 20B substantially parallel to each other. This is possible since each emerging ray can be paired with a parallel incident ray which radiates from a common point of the image source located at the mirror 22B.

In the system depicted in FIG. 4, the reflecting surface or mirror 22C, and its axis 44, is tilted with respect to the optical axis 30C of lens 20C. However, the ray 48 is again retroreflected by the system and the retroreflected ray 48R is returned parallel to the incident ray 48. The retroreflected ray 46R, due to the ray 46, is lost because of vignetting.

The concept set forth herein above in conjunction with FIG. 3, that the retroreflected rays be considered as radiating from a source on the image plane, is highly significant. With this concept in mind, it will be readily apparent that even if the retroreflecting surface is dispersive, curved, or tilted, (as shown in FIG. 4), the system will still exhibit retroreflective properties for any and all rays which are returned to the lens by the reflecting surface.

The rays retroreflected by the optical systems depicted in FIGS. 1 to 4 are in the form of a narrow, substantially collimated beam having a high radiant flux density. It is to be noted that there is an actual increase in the radiant flux density of the retroreflected beam due to the narrowing thereof. This increase in radiant flux density is herein termed optical gain.

For example, if the irradiance produced by the radiating source at the collecting lens in FIG. 3 is 100 watts/cm² and the area of the lens is 100 cm², then the radiant flux at the image or focal plane (circle of confusion) is $$\frac{100 \text{ watts}}{\text{cm}^2} \times 100 \text{ cm}^2, \text{ or } 10^4 \text{ watts.}$$

It is a characteristic of a retroreflector to return the retroreflected energy or rays in a very narrow beam. The dimensions of the retroreflected beam is a function of the angular resolution of the retroreflector which includes the lens and the reflecting surface.

The solid angle into which the incident radiant flux will be retroreflected is determined by the square of the angular resolution of the retroreflector. If, for example, the resolution of the optical system is $10^{-4}$ radians, the solid angle into which the retroreflected beam will be returned is $10^{-8}$ steradians. One steradian being the solid angle subtended at the center of a sphere by a portion of the surface of area equal to the square of the radius of the sphere. Thus at a distance of $10^4$ cm from the focal plane the area of the retroreflected beam is only 1.0 cm². The retroreflector, by radiating into such a small solid angle, has radiant intensity of $$\frac{10^4 \text{ watts}}{10^{-8} \text{ steradian}}, \text{ or } 10^{12} \text{ watts/steradian.}$$

In order to obtain a measure of the optical gain we must compare the retroreflector to a standard or reference. This reference has been taken to be a diffuse surface known in the art as a Lambertian radiator. If the $10^4$ watts of incident radiant flux were simply re-radiated in a Lambertian manner; i. e., into a solid angle of 3.14 ($\pi$) steradians, the radiant intensity would be $$\frac{10^4 \text{ watts}}{3.14 \text{ steradians}}, \text{ or } 3.1 \times 10^3 \text{ watts/steradian.}$$

Thus, the retroreflector has an overall optical gain equal to $$\frac{10^{12} \text{ watts/steradian}}{3.1 \times 10^3 \text{ watts/steradian}}, \text{ or } 3.14 \times 10^8$$

Although there is no actual increase in radiant flux, the retroreflector has a radiant intensity which is 3.14×10⁸ greater than that of a Lambertain radiator which emits the same radiant flux. Thus, for example, a telescope having a collecting area of 100 cm² and an angular resolution of 0.1 milliradian would appear similar in size to about 3.5×10⁸ cm² of a diffuse or Lambertian radiator.

It should be noted that in almost all cases, the retroreflector will be disposed within an environment that produces background radiation in a Lambertian manner. Thus, the radiant intensity of the retroreflector is so much greater than that of a Lambertian radiator that it is easily discernible from the background, even when, (as shown in FIG. 2) a large percentage of the retroreflected radiant flux is lost due to vignetting.

It is herein to be noted that the radiant intensity of the retroreflected beam is dependent upon the characteristics of the optical system employed. If an optical system of the type shown in FIGS. 1, 2, and 4 were possible and there were no loss of energy (power) entering the system, then the radiant intensity gain would be almost infinite since the energy would be retroreflected in an almost perfectly collimated beam, i.e. a retroreflected beam whose divergence angle is almost zero. However, almost all optical systems resemble that shown in FIG. 3 and the factor which determined the divergence angle of the retroreflected beam is the size of the circle of confusion and more particularly, the least circle of confusion. The size of the least circle of confusion is dependent upon the resolution of the system and in particular upon the resolution of the focusing lens. Thus, the less aberrations in the lens, the better the resolution, the smaller the circle of least confusion, the smaller the divergence angle of the retroreflected beam, and thus the greater the optical gain.

Figure 5:
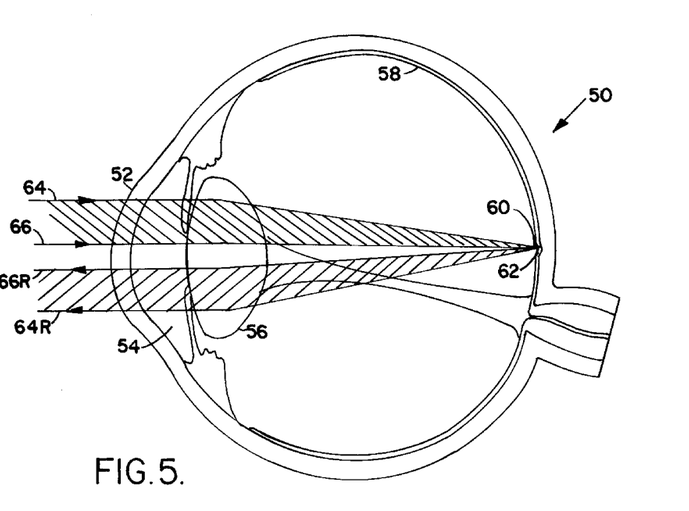
FIG. 5 is a diagram of a human eye, wherein there is depicted the retroreflection characteristics thereof.

Referring to FIG. 5, there is shown a magnified cross-sectional view of a human eye denoted generally by the reference numeral 50. The eye includes a cornea 52, an anterior chamber 54, a lens 56, and a retina 58. The retina has a small portion or point 60 thereon termed the yellow spot or macula lutea, which is approximately 2 mm in diameter. At the center of the macula lutea is the fovea centralis 62 whose diameter is approximately 0.25 m. The acuity of vision is greatest at the macula lutea and more particularly at the fovea centralis. Thus, the eye is always rotated so that the image being examined or the rays entering thereon fall on the fovea 62. As seen in FIG. 5, rays 64 and 66 enter the eye and pass through the cornea 52 and the anterior chamber 54 and are refracted by the lens 56 and focused on the fovea centralis portion 62 of the retina 58. The rays are then reflected, passing through the lens 56, anterior chamber 54 and cornea 52 and emerge therefrom as retroreflected rays 64R and 66R which are parallel to the rays 64 and 66. Thus, it is seen that even the human eye acts as a retroreflector.

Referring now to FIG. 6, there is shown an optical system for transmitting and receiving radiant energy, the more particularly a beam splitter for transmitting radiant energy and for receiving or recovering a portion of said radiant energy.

The beam splitter includes an optical bench 70 having an optical system consisting of a lens 72 and a rotating pattern or reticle 74, which may also be a modulator, said system being placed on said bench. The beam splitter also includes a radiant energy source 76, a collimator 78, a thin plate of glass 80 having a semi-reflective coating thereon, a detector 82. In the operation of the beam splitter, the radiant energy from the source 76 is collimated to form a beam by the collimator 78 and the beam is directed upon the glass plate 80, a portion of the energy in the beam being reflected and a portion of the energy in the beam being transmitted by the glass plate. The energy is then transmitted down the optical bench 70 where the lens refracts the transmitted energy and focuses the beam upon the reticle 74 from whence is is retroreflected back to the glass plate. A portion of the retroreflected energy passes through the glass plate and is lost, and a portion thereof is reflected by the glass plate and detected by means of the detector and the output thereof is then fed to the utilization means 83. The detector 82 is thus effectively positioned within or concentric with the retroreflected energy beam without affecting the transmission of radiant energy from the source to the optical system. The energy obtained by the utilization means can be used to obtain the spectral and temporal characteristics of the retroreflected beam, and may the be compared with the transmitted beam to determine various characteristics of the optical system being investigated. It will be apparent that the use of this test instrument makes possible the investigation and characterization of optical systems in terms of recording the retroreflective characteristics thereof.

The rotating pattern or reticle 74 can be replaced with a reflective surface and a modulator placed on the light incident side of the lens 72. The modulator can then be tilted so that none of the light reflected from its surface returns to the beam splitter 80 to be reflected to the detector 82. The only light then returning to the detector 82 will be that modulated by the modulator and reflected back from the reflective surface replacing the reticle 74.

Figure 7:
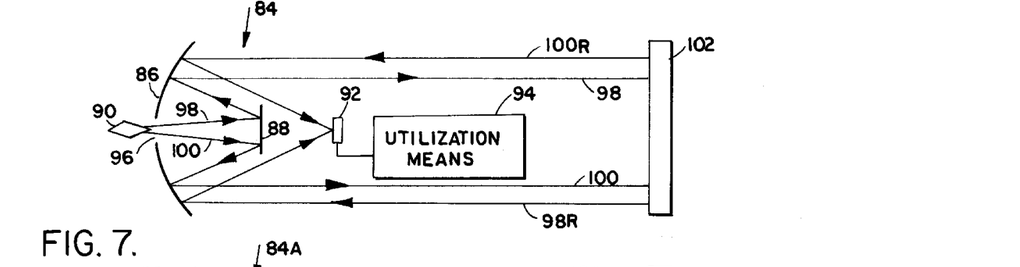
FIG. 7 is a schematic representation depicting a concentric optical system for transmitting and receiving radiant energy.

FIG. 7 depicts a folded concentric optical system for transmitting and receiving radiant energy—also known as an optical transceiver. The optical transceiver 84 includes a primary mirror 86 having a substantially parabolic shape, a secondary mirror 88 having a planar configuration, a radiant energy source 90, a detector 92 and a utilization means 94. The primary mirror has an aperature 96 concentric with its principal axis and the principal axis of the secondary mirror is aligned so as to be coaxial therewith. The light source and detector are also aligned with the mirrors so that all of the aforesaid elements are concentrically disposed with respect to each other. The light source is positioned adjacent to the nonreflecting surface of the primary mirror while the detector is positioned adjacent to the nonreflecting surface of the secondary mirror.

In the operation of the transceiver 84, rays 98 and 100 are emitted by the radiant energy source 90, and impinge upon the secondary mirror 88, from whence they are reflected and impinge upon the primary mirror 86. The rays are then reflected by the primary mirror and directed towards an optical instrument 102 which exhibits retroreflective characteristics. The incident rays are retroreflected by the optical instrument 102 and are returned as retroreflected rays 98R and 100R. The rays 98R and 100R return in a direction parallel to the rays 98 and 100 and impinge upon the primary mirror 86 and are reflected thereby towards the detector 92 where they are detected, and the detector output signal is then fed to the utilization means 94.

As discussed previously, the term optical instruments exhibiting retroreflective characteristics include the eyes of animals and humans.

Figure 7A:
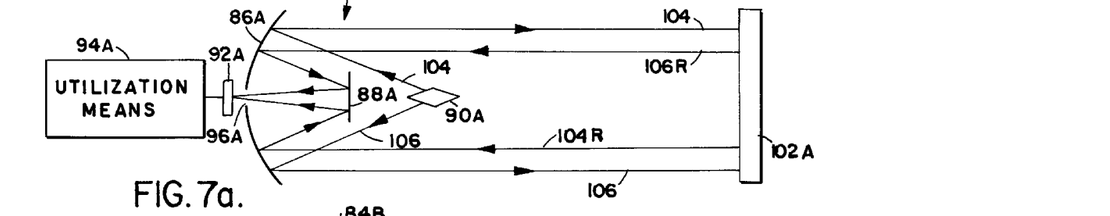
FIG. 7a is a schematic representation of another embodiment of the concentric optical system depicted in FIG. 7.

A second embodiment of a folded concentric optical transceiver is shown in FIG. 7a, wherein similar parts are denoted by similar reference numerals.

In this embodiment the light source 90A is positioned adjacent to the nonreflecting surface of the secondary mirror 88A and the detector 92A is positioned adjacent to the nonreflecting surface of the primary mirror 86A.

In the operation of the transceiver 84A, rays 104 and 106 are emitted by the radiant energy source 90A, and impinge upon the primary mirror 86A, from whence they are reflected towards the optical instrument 102A. The rays are retroreflected by the optical instrument and are returned as retroreflected rays 104R and 106R. The rays 104R and 106R return in a direction parallel to the rays 104 and 106 and impinge upon the primary mirror and are reflected thereby towards the secondary mirror through the aperture 96A to the detector 92A, and the output signal of the detector is then fed to the utilization means 94A.

Figures 7B, 8, 9:
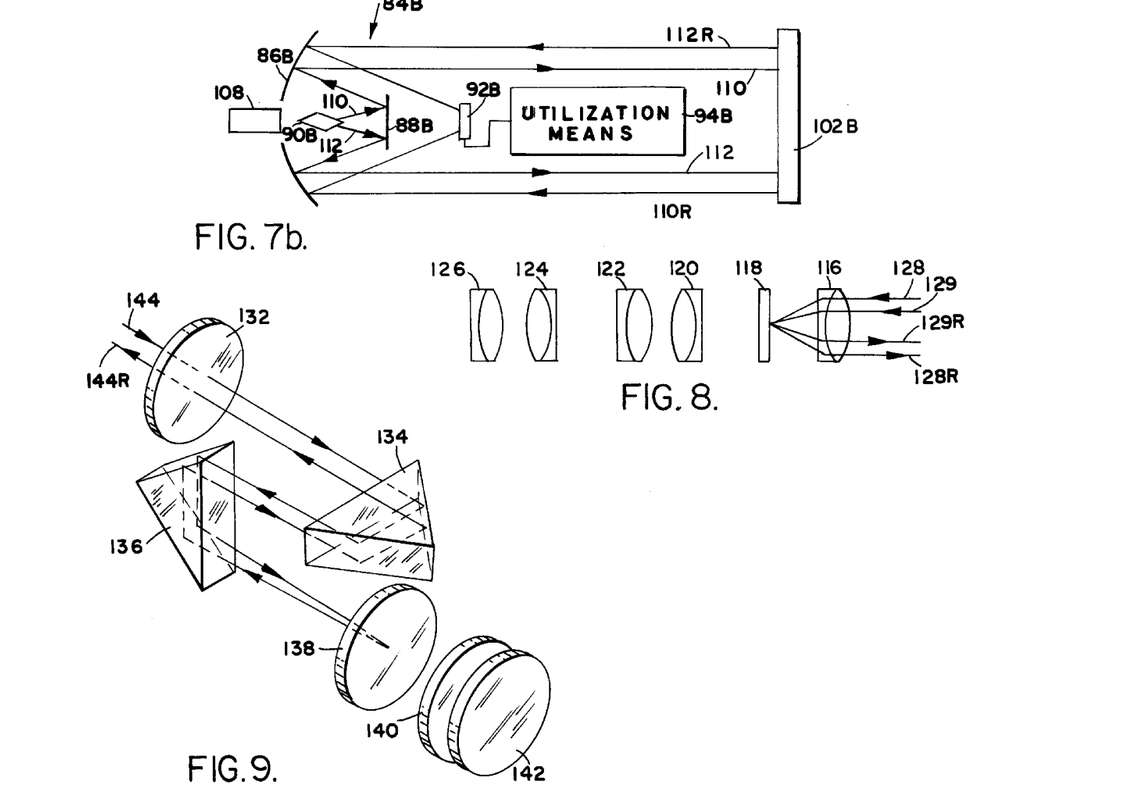
FIG. 7b is a schematic representation of still another embodiment of the concentric optical system depicted in FIG. 7.
FIG. 8 is a schematic representation depicting an ordinary telescope as an image forming system having retroreflection characteristics.
FIG. 9 is a schematic representation depicting one half of an ordinary binocular as an image forming system having retroreflection.

A third embodiment of a folded concentric optical transceiver is depicted in FIG. 7b, wherein similar parts are denoted by similar reference numerals.

In this embodiment, the detector 92B is once more positioned adjacent to the nonreflecting surface of the secondary mirror 88B and the radiant energy source 90B is positioned between the reflecting surfaces of the primary mirror 86B and the secondary mirror 88B. There is also included a collector 108, which may be an elliptically shaped mirror for collecting the spurious radiation rays from the source 90B and reflecting back upon the source, wherefrom they are directed upon the secondary mirror and ultimatel directed toward the optical instrument 102B.

In the operation of the transceiver 84B, energy from the radiant energy source 90B impinges upon the secondary mirror 88B, and more particularly rays 110 and 112 so impinge. These rays are reflected by the secondary mirror towards the primary mirror, from where they are once more reflected towards the optical instrument 102B. The incident rays 110 and 112 are then retroreflected by the optical instrument and returned as retroreflected rays 110R and 112R. The rays 110R and 112R return in a direction parallel to the rays 110 and 112 and impinge upon the primary mirror and are reflected thereby towards the detector 92B where they are detected and the output thereof is then fed to the utilization means 94B.

It is herein to be noted that although the folded optical transceivers depicted in FIGS. 7, 7a, and 7b have been shown as being concentric, it is also possible to employ the above type of transceivers wherein their optical characteristics are not concentric. However, it has been found from the view-point of efficiency and efficacy that the concentric optical transceivers are more desireable.

FIG. 8 is an optical schematic representation of a telescope having an objective lens 116, a reticle 118, a pair of erector lenses 120 and 122, a field lens 124, and an eyelens 126.

Thus, when rays 128 and 129 are directed towards the objective 20 lens 116, they are focused on the reticle 118 and retroreflected thereby to produce retroreflected rays 128R and 129R respectively, whose direction is opposite and parallel to that of the incident rays 128 and 129. Thus, the combination of the objective lens 116, and the reticle 118 form a retroreflective optical instrument, in and of themselves.

It is herein to be noted that even if the reticle 118 is merely plain glass, as in most cases it is, it still exhibits some degree of reflectivity, which reflectivity gives rise to the retroreflected rays 128R and 129R.

It is herein also to be noted that incident rays passing through the telescope to the eye of the observer are also retroreflected by the eye of the observer. Thus, there is in effect, two retroreflective optical systems and thus two retroreflective signals.

FIG. 9 is an optical schematic representation of one half of a binocular and comprises an objective lens 132, a first porro prism 134, a second porro prism 136, a reticle 138, a field lens 140, and an eyelens 142. When a ray such as 144 is incident on the objective lens 132, it is focused thereby on the reticle 138, after passing through the porro prisms 134 and 136. It is herein to be noted that although the ray 144 is directed along a path which is not straight; i.e., there are several right angle bends therein, the entire path is still part of the focal path of the instrument. Thus, the ray 144 is focused on the reticle 138, causing the same to be retroreflected as ray 144R which then goes through a path similar to that of ray 144 and emerges from the objective lens 132 in a direction which is opposite and parallel to that of the incident ray 144. It is to be noted that the description herein above describing a single ray is for purposes of simplicity of explanation.

Figures 10, 11:
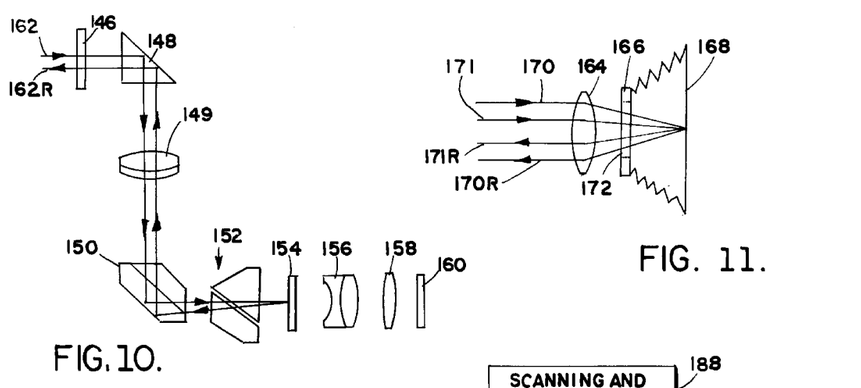
FIG. 10 is a schematic representation depicting an ordinary periscope as an image system having retroreflection characteristics.
FIG. 11 is a schematic representation depicting an ordinary camera as an image forming system having retroreflection characteristics.

FIG. 10 is an optical schematic representation of a periscope. The periscope includes a window 146, an objective prism 148, an objective lens 149, an amici prism 150, an erecting prism assembly 152, a reticle 154, a field lens 156, an eyelens 158, and a filter 160. An incident ray 162 enters the periscope through the window 146, then passes through the prism 148, objective lens 149, amici prism 150, and erecting prism assembly 152 to the reticle 154 whereon the incident ray is reflected and emerges from the periscope as retroreflected ray 162R whose direction is opposite and parallel to the incident ray 162. Again it is to be noted that the description above describing a single ray is merely for the purpose of simplicity of explanation.

FIG. 11 is an optical schematic representation of a camera. The camera includes a lens 164, a shutter 166, and film 168. In the operation of the camera when a picture is taken the shutter opens and incident rays 170 and 171 are focused on the film 168 through an aperture 172 in the shutter, by means of the lens 164. These rays are then reflected by the film and emerge from the lens as retroreflected rays 170R and 171R.

It is to be noted that most, if not all, optical systems will have a reflecting surface such as a reticle, a lens, or a prism in the focal plane, and the incident radiation will be retroreflected by any such surface.

Figure 12:
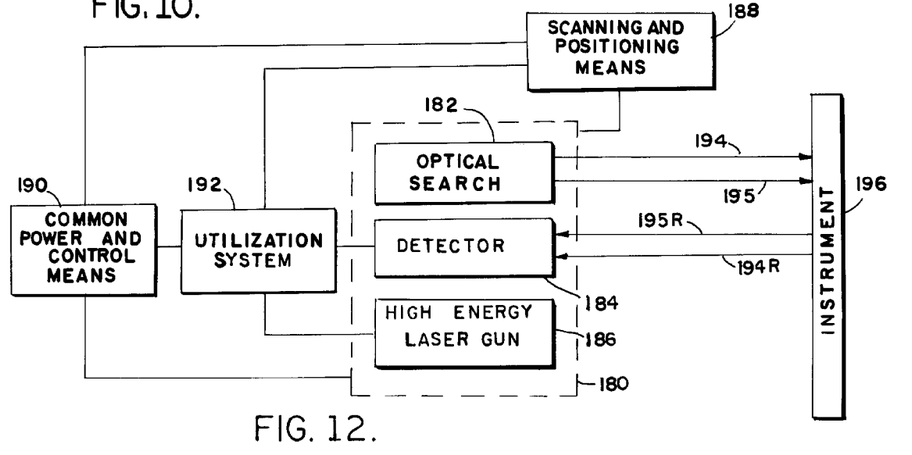
FIG. 12 depicts a system for scanning an area to detect the presence of optical instruments by utilizing the retroreflection characteristics thereof and for neutralizing observers using said optical instruments, and/or rendering the instruments ineffective.

Referring now to FIG. 12, there is shown one embodiment of a system for detecting the presence of an optical instrument, for tracking said instrument, and for neutralizing observers utilizing said instrument and/or rendering the instrument ineffective.

The system includes a scanner 180, including an optical searching means 182, such as a source of infrared light, a detector 184, and a laser 186. It is herein to be noted that the search means 182 and the detector 184 may be combined in the form of a transceiver as described hereinbefore in conjunction with FIGS. 7, 7a, and 7b. The scanner 182 is controlled by a scanning and positioning means 188, which includes a servo motor (not shown.) The scanning and positioning means 188 is powered by a power and control means 190, which means also supplies power for the scanner 180, and a utilization system 192.

In the operation of the system, the scanner 180 is caused to scan a preselected area by means of the scanning and positioning means 188, the means 188 being programmed by the utilization system 192. The optical searching means emits rays 194 and 195, when these rays impinge upon an optical instrument 196 exhibiting retroreflective characteristics, as hereinbefore described, they are retroreflected as retroreflected rays 194R and 195R respectively, and detected by the detector 184 and the detector output is then fed to the utilization system 192. The utilization system may be programmed to merely track the instrument 196, in which case, this information would be fed to the scanning and positioning means 188 and thence to the scanner 180 causing it to track said instrument. However, if it is desired to neutralize the observer using the instrument, or to render the instrument ineffective, then the utilization system 192 will feed a signal to the laser 186 activating the same and causing a high intensity laser beam to be directed at the instrument, thereby accomplishing the aforementioned objects.

It is herein to be noted that although the present system has been described as employing a laser, it is also possible to use any other high energy system, weapon, or weapon system.

With the present system, it will be readily apparent to those skilled in the art, that a hostile satellite orbiting the earth and employing optical surveillance equipment to monitor a country's activities can be detected and its surveillance capability destroyed.

It is herein again to be noted that the aberrations in almost all optical instruments cause a small divergence of the retroreflected rays, the amount of said divergence being governed by the resolution of the retroreflector. As a practical matter the angular resolution of optical systems such as binoculars, periscopes, telescopes, cameras, and optical systems carried by missiles will be between about $10^{-3}$ and $10^{-5}$ radians which produce retroreflected beams of $10^{-6}$ to $10^{-10}$ steradians. At a range of 1,000 feet the area of these beams would be 1.0 and $10^{-4}$ ft$^2$ respectively. This divergence is so small so that the retroreflected rays are substantially collimated.

It is herein to be noted that in microwave application corner reflectors have been utilized for retroreflecting purposes. However, the present invention enables the detection of microwave apparatus, such as antennas and the like which do not have a corner reflector as an integral part thereof, by utilizing the inherent retroreflection characteristics of the apparatus as hereinbefore discussed. Thus, this apparatus and systems exhibiting the retroreflection phenomenon can be similarly detected by the use of radio frequency, microwave, X-ray, acoustical or any similar types of energy directed thereat.

In many microwave antenna systems microwave lenses are utilized in place of reflectors for the purposes of obtaining wide angle scanning as compared with the system bandwidth. These microwave lenses exhibit characteristics which are equivalent to the optical lenses hereinbefore discussed, and thus a detailed explanation of the retroreflection of microwave and similar types of energy by these lenses, in conjunction with a reflective surface, will be readily apparent to those skilled in the art.

Figure 13:
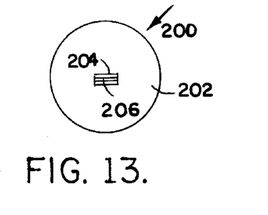
FIG. 13 is a diagram of a radar system, and more particularly of a radar antenna which is to be detected in accordance with the principles of the present invention.

In this connection, FIG. 13 is an illustration of a radar system which is to be detected by means of the retroreflection principles of the present invention. The radar system is generally indicated by the reference numeral 200 and includes a parabolic disk antenna 202 having a feed 204 whose impedance mismatch is lowest at the operating frequency of the radar system 200.

When the radar system 200 is in an off condition, the resonant frequency of the antenna feed 206 can be detected by beaming swept frequency microwave energy at the system such as by utilizing a variable frequency klystron (not shown) or the like.

Figure 14:
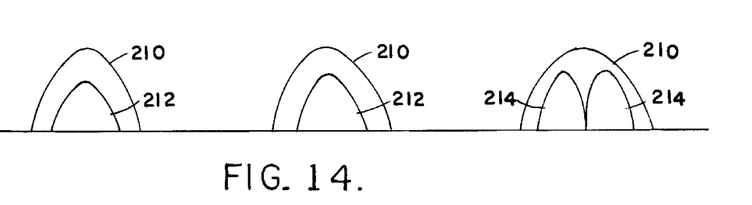
FIG. 14 depicts the waveforms obtained during the detection of the radar system shown in FIG. 13.

The pulses produced by the klystron are indicated as 210 in the waveforms shown in FIG. 14. The wave energy 210 is retroreflected by the parabolic disk antenna 202 because the parabola focuses the energy at the feed horn which in turn is mismatched. Hence, the energy reflected from it is recollimated by the parabola similar to the optical system described heretofore. The energy is detected in a suitable manner and produces the waveforms indicated at 212 in FIG. 14, until such time that the frequency of the klystron is equal to the operating frequency of the feed 206. When this occurs, the energy beamed to the radar system is focused on the feed horn, absorbed by the feed 206 and is therefore not retroreflected. This results in the waveform indicated as 214 in FIG. 15. The dip or drop in power level indicates absorption of the beamed energy and thus the frequency of the operation of the radar system is now known. By further analysis of the retroreflected waves it is possible to obtain even more information concerning the electrical and mechanical characteristics of the radar system 200, such as the type of antenna system being utilized, its scan angle, its beamwidth, its gain, etc.

It will be apparent to those skilled in the art that if the antenna were a sonar disk and acoustical energy were directed threat, the acoustical energy would be retroreflected and the retroreflected acoustical energy would be capable of detection.

It is thus again reiterated that although only a few types of radiant energy have herein been discussed, any type of energy which can be retroreflected may be employed.

While we have shown and described various embodiments of our invention, there are many modifications, changes, and alterations which may be made therein by a person skilled in the art without departing from the spirit and scope thereof as defined in the appended claims.

What is claimed is:

1. The method of detecting an uncooperative optical system including a focusing means and a surface exhibiting some degree of reflectivity disposed substantially in the focal plane of said focusing means, said method comprising     the step of directing optical energy at said optical system whereby that portion of said energy incident upon said optical system is retroreflected with an optical gain to thereby form a beam of retroreflected optical energy, and     the step of detecting said retroreflected optical energy having a radiant flux density in excess of a preselected value to thereby indicate the presence of said optical system.

2. The method of claim 1, including the step of scanning a predetermined geographical area to detect the presence of an optical system therein.

3. The method of claim 2, including the step of tracking said optical system after the presence thereof has been detected.

4. The method of claim 3, including the step of directing a weapon at the position of said optical system after the detection thereof.

5. The method of claim 1, wherein the radiant energy directed at said optical system is in the nonvisible region.

6. The method of claim 1, wherein the radiant energy directed at said optical system is light energy in the nonvisible region.

7. The method of claim 6, wherein the light energy in the nonvisible region is infrared.

8. The method of claim 4, wherein said weapon is a laser.

9. The method of claim 1, wherein the radiant energy is in the ultraviolet portion of the electromagnetic spectrum.

10. The method of claim 1, wherein the radiant energy is X-ray energy.

11. The method of claim 1, wherein the radiant energy comprises high energy particles related to quantum mechanics.

12. The method of claim 1, wherein the radiant energy is acoustical energy.

13. The method recited in claim 1 wherein said optical system is a telescope.

14. The method recited in claim 1 wherein said optical system is a binocular.

15. The method recited in claim 1 wherein said optical system is a periscope.

16. The method recited in claim 1 wherein said optical system is a human eye.

17. Apparatus for detecting the presence of an uncooperative optical system including a focusing means and a surface exhibiting some degree of reflectivity disposed substantially in the focal plane of said focusing means, said apparatus comprising     means for producing radiant energy,     means for directing said energy toward said optical system whereby said energy is retroreflected with an optical by said optical system, and means for detecting said retroreflected energy having a radiant flux density in excess of a preselected value to thereby indicate the presence of said optical system.

18. Apparatus in accordance with claim 17 wherein said means for producing radiant energy is a radiant energy source operative in the nonvisible region.

19. Apparatus in accordance with claim 17, wherein said means for producing radiant energy is a radiant energy light source.

20. Apparatus in accordance with claim 19, wherein said radiant energy light source is an infrared source.

21. Apparatus in accordance with claim 17, wherein said means for producing radiant energy, said means for directing said energy toward said optical system, and said means for detecting the energy retroreflected by said optical system, form an optical transceiver.

22. Apparatus in accordance with claim 21, wherein said means for producing rays of radiant energy,
said means for directing said rays toward said optical instrument, and
said means for detecting the rays retroreflected by said optical instrument are concentrically disposed with respect to one another.

23. Apparatus in accordance with claim 22, wherein said means for producing radiant energy, said means for directing said energy toward said optical system, and said means for detecting said energy retroreflected by said optical system are concentrically disposed with respect to one another.

24. Apparatus in accordance with claim 22, wherein
said means for producing radiant energy comprises a radiant energy source
said means for directing said energy toward said optical system comprises a primary mirror having a substantially parabolic configuration, and
said means for detecting said retroreflected energy comprising
a detector
said primary mirror, and
a secondary mirror having a substantially planar configuration
said primary mirror having an aperture concentric with the principal axis thereof,
said radiant energy source being positioned
adjacent the non-reflecting surface of said secondary mirror,
in the focal plane of said primary mirror,
said secondary mirror being positioned
adjacent said primary mirror, and
having the reflecting surface of said secondary mirror facing the reflecting surface of said primary mirror, and
said detector
being positioned adjacent the non-reflecting surface of said primary mirror,
being in axial alignment with the aperture thereof,
being positioned in the focal plane of said detection means.

25. Apparatus in accordance with claim 22, wherein
said means for producing radiant energy comprises a radiant energy source,
said means for directing said energy toward said optical system comprises
a collecting mirror having a substantially elliptical configuration
a primary mirror having a substantially parabolic configuration, and
a secondary mirror having a substantially planar configuration,
said means for detecting said retroreflected energy comprising
a detector, and
said primary mirror,
said primary mirror having an aperture concentric with the principal axis thereof,
said secondary mirror being positioned with the reflecting surface thereof facing the reflecting surface of said primary mirror,
said radiant energy source
being positioned between the reflecting surfaces of said primary and secondary mirrors, and
in axial alignment with said mirrors,
said collecting mirror being positioned adjacent the non-reflecting surface of said primary mirror,
in axial alignment with the aperture thereof, and said detector being positioned in the focal plane of said direction means adjacent the non-reflecting surface of said secondary mirror in the focal plane of said primary mirror.

26. Apparatus in accordance with claim 21, wherein
said means for producing incident radiant energy is a radiant energy light source operative in the nonvisible region.

27. Apparatus in accordance with claim 23, wherein
said radiant energy light source is an infrared source.

28. Apparatus in accordance with claim 17, wherein
said means for directing said incident energy towards said optical system having scanning means operatively associated therewith to cause said rays to scan a predetermined geographical area to detect and locate said optical system.

29. Apparatus in accordance with claim 28, including
tracking means operatively associated with said scanning means to thereby track the movement of said optical system after detection thereof.

30. Apparatus in accordance with claim 28, including
weapon means operatively associated with said tracking means for use against said optical system after detection thereof.

31. Apparatus in accordance with claim 30, wherein
said weapon means is high energy source.

32. Apparatus in accordance with claim 31, wherein
said high energy source is a laser.

33. The apparatus recited in claim 17 wherein said optical system is a telescope.

34. The apparatus recited in claim 17 wherein
said optical system is a binocular.

35. The apparatus recited in claim 17 wherein
said optical system is a periscope.

36. The apparatus recited in claim 17 wherein
said optical system is a human eye.

37. Apparatus for measuring the retroreflective characteristics of an optical system consisting of at least a focusing means and a surface exhibiting some degree of reflectivity disposed substantially in the focal plane of said focusing means, said apparatus comprising
a radiant energy source,
detection means,
measuring means connected to said detection means, and
means for directing said radiant energy produced by said source at said optical system, whereby said radiant energy is retroreflected with an optical gain by said optical system and detected by said detecting means and the output thereof is coupled to said measuring means.

38. An optical system accordance with claim 37, including means disposed between said radiant energy source and said optical system for transmitting a portion of the radiant energy produced by said radiant energy source toward said optical system, and for transmitting a portion of said energy retroreflected by said optical system toward said detecting means.

39. An optical system in accordance with claim 38, wherein said directing means and said detecting means are substantially concentric.

40. The method of detecting the presence of devices which exhibit the phenomenon of retroreflection, said method comprising the step of directing radiant energy at said devices whereby said radiant energy is retroreflected with an optical gain by said devices, and the step of detecting said retroreflected radiant energy which is in excess of a preselected radiant flux density level to thereby indicate the presence of said devices.

41. The method of claim 40, including the step of analyzing said retroreflected radiant energy to thereby determine the spatial and temporal characteristics of said devices.

42. Apparatus for detecting the presence of devices which exhibit the phenomenon of retroreflection, said apparatus comprising means for producing radiant energy, means for directing said energy toward said devices whereby said energy is retroreflected with an optical gain by said devices, and means for detecting said retroreflected energy which is in excess of a preselected radiant flux density level to thereby indicate the presence of said devices.

43. apparatus for measuring the retroreflective characteristics of devices which exhibit the phenomenon of retroreflection, said apparatus comprising means for producing radiant energy, means for directing said energy toward said devices whereby said energy is retroreflected with an optical gain by said devices, means for detecting said retroreflected energy which is in excess of a preselected radiant flux density level to thereby indicate the presence of said devices, and means for analyzing said detected energy to thereby determine the characteristics of said devices.

44. The method of detecting an uncooperative and non-radiating microwave antenna system consisting of at least a microwave focusing means and a microwave feed horn disposed substantially at the focal point of said focusing means, said method comprising the step of directing swept frequency microwave energy at said antenna system whereby substantially all energy at the operating frequency of said antenna system which is impingent thereon is focused by said focusing means and absorbed by said feed horn and energy of any other frequency is retroreflected by said antenna system with an energy density gain to thereby form a beam of retroreflected microwave energy, and the step of detecting said retroreflected energy having an energy density in excess of a preselected value to thereby indicate the presence of said antenna system.

45. The method recited in claim 44 further including the step of determining the frequency at which the energy density of said retroreflected energy is of a minimum level to thereby determine the operating frequency of said antenna system.

46. The method recited in claim 44 further including the step of analyzing any temporal characteristics of said energy retroreflected by said antenna system.

47. The method recited in claim 44 further including the step of analyzing any spatial characteristics of said beam of energy retroreflected by said antenna system.

\* \* \* \* \*